United States Patent [19]

Murugan

[11] Patent Number: 5,325,042

[45] Date of Patent: Jun. 28, 1994

[54] TURBINE ENGINE START SYSTEM WITH IMPROVED STARTING CHARACTERISTICS

[75] Inventor: Muthu K. Murugan, Howell, N.J.

[73] Assignee: Allied Signal Inc., Morris Township, Morris County, N.J.

[21] Appl. No.: 11,022

[22] Filed: Jan. 29, 1993

[51] Int. Cl.$^5$ ............................................. F02N 11/00
[52] U.S. Cl. ................................... 322/10; 322/29
[58] Field of Search ................ 322/10, 11, 14, 29; 290/31, 38 R, 46

[56] References Cited

U.S. PATENT DOCUMENTS

| | | | |
|---|---|---|---|
| 4,330,743 | 5/1982 | Glennon | 322/10 |
| 4,447,868 | 5/1984 | Turnbull | 363/81 |
| 4,489,323 | 12/1984 | Glennon et al. | 322/29 X |
| 4,597,039 | 6/1986 | Alexander | 363/138 |
| 4,786,852 | 11/1988 | Cook | 322/10 |
| 4,841,216 | 10/1989 | Okada et al. | 322/10 |
| 5,036,267 | 7/1991 | Markunas et al. | 322/10 |
| 5,038,263 | 8/1991 | Marrero et al. | 363/20 |
| 5,055,764 | 10/1991 | Rozman et al. | 322/10 |

Primary Examiner—Kristine L. Peckman
Attorney, Agent, or Firm—Donald B. Paschburg; Howard G. Massung

[57] ABSTRACT

A turbine engine start system accepts either AC or DC and performs power conversion for multiple functions such as starting an AC synchronous generator as a synchronous motor without degradation of input power quality and with minimal generation of EMI. The system utilizes common magnetic components and common semiconductor transistors and rectifiers within its four major subcircuits. The four major subcircuits include a transformer rectifier, a boost converter, a voltage source inverter and a field excitation controller.

8 Claims, 3 Drawing Sheets

TURBINE ENGINE START SYSTEM WITH IMPROVED STARTING CHARACTERISTICS

BACKGROUND OF THE INVENTION

1. Field of the Invention

The present invention relates to power converters, and more particularly to converters that start an AC synchronous generator mounted on an APU (Auxiliary Power Unit) with minimal disturbance to the AC input power quality and with minimal generation of EMI.

2. Description of the Prior Art

There are a variety of power converter designs that are used to start an AC synchronous generator as a motor. The conventional power converters have been found to pollute the input source and degrade AC input power quality. The conventional designs employ two separate converters, one that starts the AC synchronous generator from an AC input source and another converter that starts the AC synchronous generator from a 24 VDC battery input or from a 28 VDC transformer rectifier unit. The use of two separate converters increases weight and decreases reliability. It is an object of the present invention to take advantage of the common components of the individual converters and to provide a start function without degradation of AC input power quality.

SUMMARY OF THE INVENTION

The present invention provides a converter capable of starting an AC synchronous generator as a synchronous motor from a three-phase AC input or from a DC input with minimal disturbance to input power quality. Within the disclosed converter, the magnetic components as well as several of the semiconductor components such as transistors and rectifiers perform multifunctions. This multifunctionality serves to minimize the total component count allowing the converter to be both compact and lightweight; two critical attributes for aerospace applications.

DETAILED DESCRIPTION OF THE INVENTION

Figure 1:
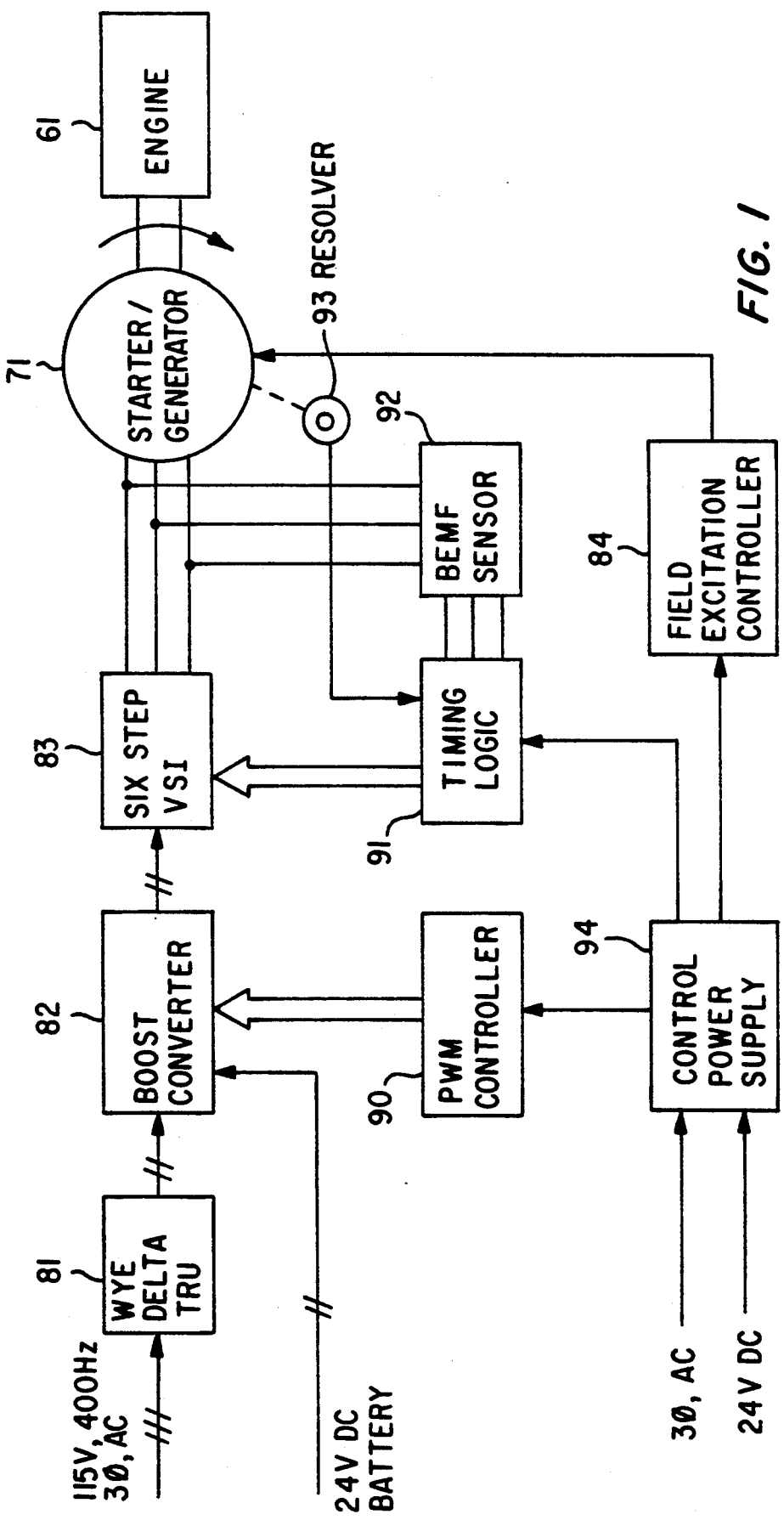
FIG. 1 is a block diagram of a preferred embodiment of the present invention.

As shown in FIG. 1, the present invention consists of mainly four major subcircuits. They are wye-delta transformer rectifier 81, boost converter 82, six-step voltage source inverter 83, and field excitation controller 84.

AC input power enters the transformer rectifier 81 and the DC output from the transformer rectifier is fed to the boost converter 82. DC input power enters the boost converter 82 directly from the battery or DC power supply. The output of the boost converter 82 is fed to the six-step voltage source inverter 83 during AC input start or DC input start of the generator. The transformer rectifier 81 provides DC output compatible to a 28 VDC battery bus from a three phase AC input.

The boost converter is controlled by the PWM controller 90 and provides variable DC voltage to the six-step voltage source inverter 83. The six-step voltage source inverter is controlled by the timing logic 91 and the inverter supplies variable voltage, variable frequency, to the main stator of the starter/generator 71. The inverter drive signals from the timing logic are locked to rotor position information obtained either directly from a resolver 93 or indirectly from a back EMF sensor circuit 92. This feature ensures that the generator never pulls out of sync and operates as a brushless DC motor.

The control power supply 94 receives three phase AC input power and battery power and provides control power to the PWM controller 90, the timing logic 91 and the field excitation controller 84. The field excitation controller 84 converts the 24 VDC power from the control power supply 94 to three-phase 400 Hz square wave voltage and provide excitation to the three-phase exciter stator of the starter/generator 71 mounted on the engine 61.

The transformer rectifier and the boost converter also provide input/output isolation so that there is no need to disconnect the starter/generator neutral or battery negative from the common ground.

Figure 2:
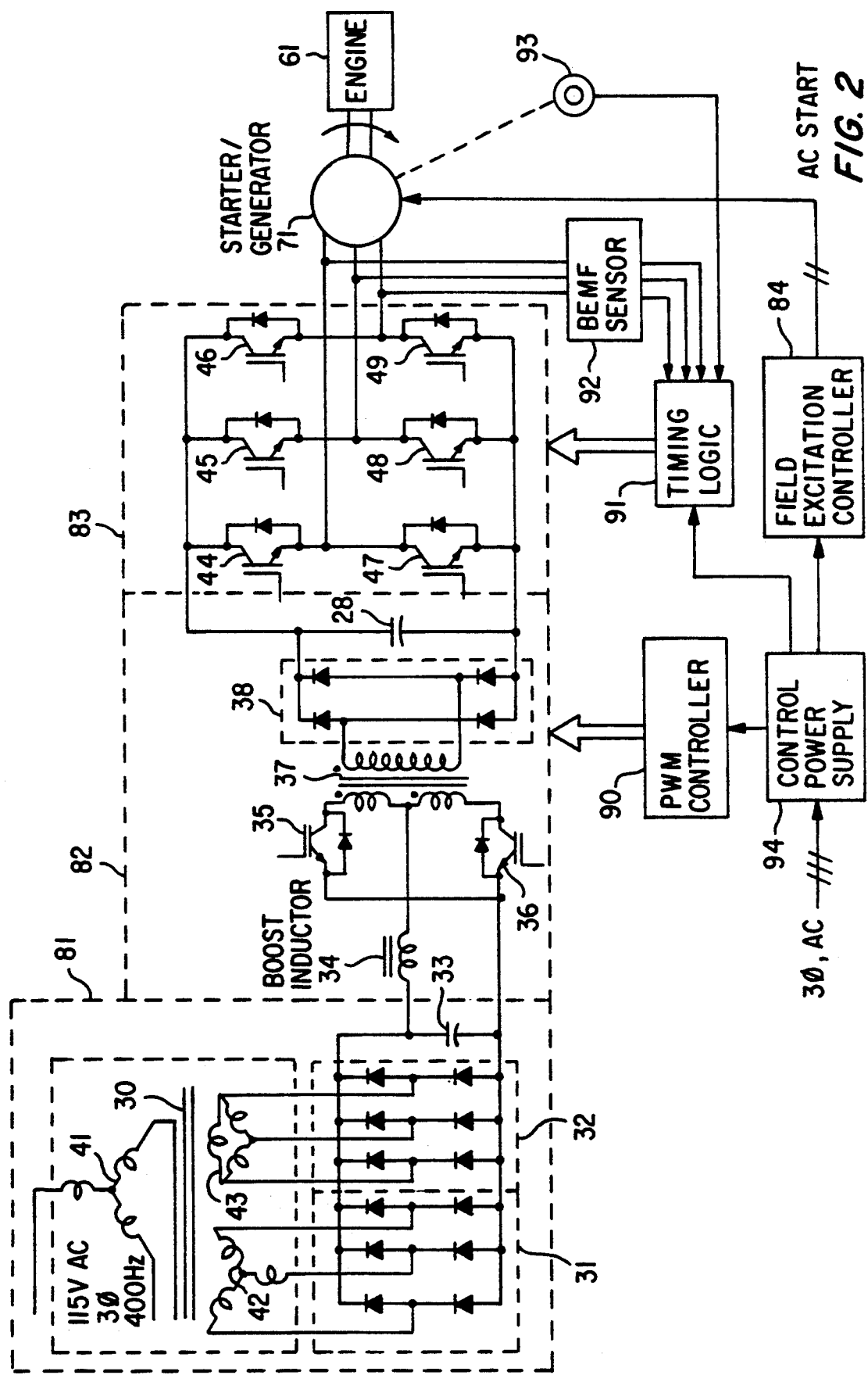
FIG. 2 is a schematic diagram illustrating a circuit equivalent to the preferred embodiment of the present invention during starting of an AC synchronous generator as a synchronous motor from a three-phase AC input.

FIG. 2 illustrates the present invention utilized for starting an AC synchronous generator from a three-phase AC input. The transformer rectifier 81 comprises a transformer 30, three-phase full wave bridge rectifiers 31 and 32 and capacitor 33. The three-phase AC input enters the wye connected primary winding 41 of the transformer 30. The transformer 30 comprises two sets of secondary windings 42 and 43, one of them is wye-connected and the other is delta-connected. The output of the wye secondary winding 42 is rectified by the three-phase bridge rectifier 31 and the output of the delta secondary winding 43 is rectified by the three-phase bridge rectifier 32. The output of bridge rectifiers 31 and 32 are paralleled at the output and filtered by the capacitor 33. This signal then enters boost converter 82. The DC output is compatible to a 24 V battery bus.

The boost converter 82 comprises boost inductor 34, boost transistors 35 and 36, isolation transformer 37 full wave single phase bridge rectifier 38 and DC filter capacitor 28. The output of the boost converter that is filtered by capacitor 28 enters the six-step voltage source inverter 83 which comprises three pairs of transistor/diodes 44-49 in parallel The energy is stored in the boost inductor 34 by turning "ON" both transistors 35 and 36. During this period, the six-step voltage source inverter 83 is supplied by the energy stored in the capacitor 28. The energy stored in the boost inductor is delivered to load by turning "ON" transistors 35 or 36 alternatively followed by the energy storage cycle of the boost inductor. The secondary output of the transformer 37 is rectified by the full wave bridge rectifier 38 and fed to the six-step inverter 83. The boost converter 82 is controlled by the pulse width modulation controller 90.

The speed torque characteristics of the APU engine to be started is such that the drag torque increases with speed, up to the engine light-off and the engine provides torque assist after light-off Only about 20-25% of the rating of the generator power is required to start the APU engine and constant power operation mode provides sufficient torque to overcome the engine drag torque and accelerate the engine to the rated speed within allowable time.

Constant input power operation mode has been selected as the starter/generator develops sufficient torque to overcome drag/torque and start the engine The boost inductor 34 is chosen such that the boost converter 82 operates in discontinuous conduction mode and at a constant 50% duty cycle. By operating at a constant duty cycle, the output power delivered by the boost converter 82 is constant In a constant power operation, output voltage of the boost converter that is fed to the six-step voltage source inverter 83 varies as a square root of the load resistance. In other words, the boost converter output voltage increases as the load increases.

The six-step voltage source inverter 83 operates from the output obtained from the boost converter. The output from the inverter 83 is applied to the stator of AC starter/generator 71 mounted on the engine 61. The inverter is controlled by the timing logic 91 The inverter drive signals from the timing logic are locked to the rotor position information obtained either directly from the resolver 93 or indirectly from the back EMF sensor circuit 92 This feature ensures that the synchronous machine never pulls out of synch. The control power supply 94 provides power to the timing logic 91, the field excitation controller 84 and the PWM controller 90.

When the AC synchronous starter/generator is stationary, sufficient DC excitation is provided to the main rotor field by injecting three phase square wave AC voltage from field excitation controller 84 to the three phase exciter field of starter/generator 71. By transformer action, voltages are induced in the exciter rotor windings. The induced voltages are rectified by the rotating diodes and the rectified DC voltage is applied to the main rotor field of the starter/generator 71.

At starting, a constant direct current is supplied to the stator of the AC starter/generator and three-phase AC excitation to the three phase exciter field. This produces torque and accelerates the rotor. As the rotor moves, the rotor position information is updated and the inverter drive frequency varies Normally, voltage control is provided within the boost converter and frequency control is provided within the six-step square wave inverter. However, at start-up, the boost converter operates as a current fed converter and both voltage and frequency are controlled within the six step voltage source voltage inverter.

At or around ten percent of the base speed, the boost converter operation is activated. As the generator picks up speed, the DC current drawn from the boost converter comes down and the output voltage and drive frequency goes up. The boost converter operates in discontinous mode at a constant duty cycle. As the current drawn by the boost converter is continuous, less bus capacitance is required and less EMI is generated.

The current drawn by the wye-delta transformer from the external power source is of twelve step during starting. The filters required to filter the input harmonic are small in size and weight With this type of engine start, minimum disturbance is introduced to the input source. In other words, input power quality such as high input power factor and low harmonic distortion is maintained.

Figure 3:
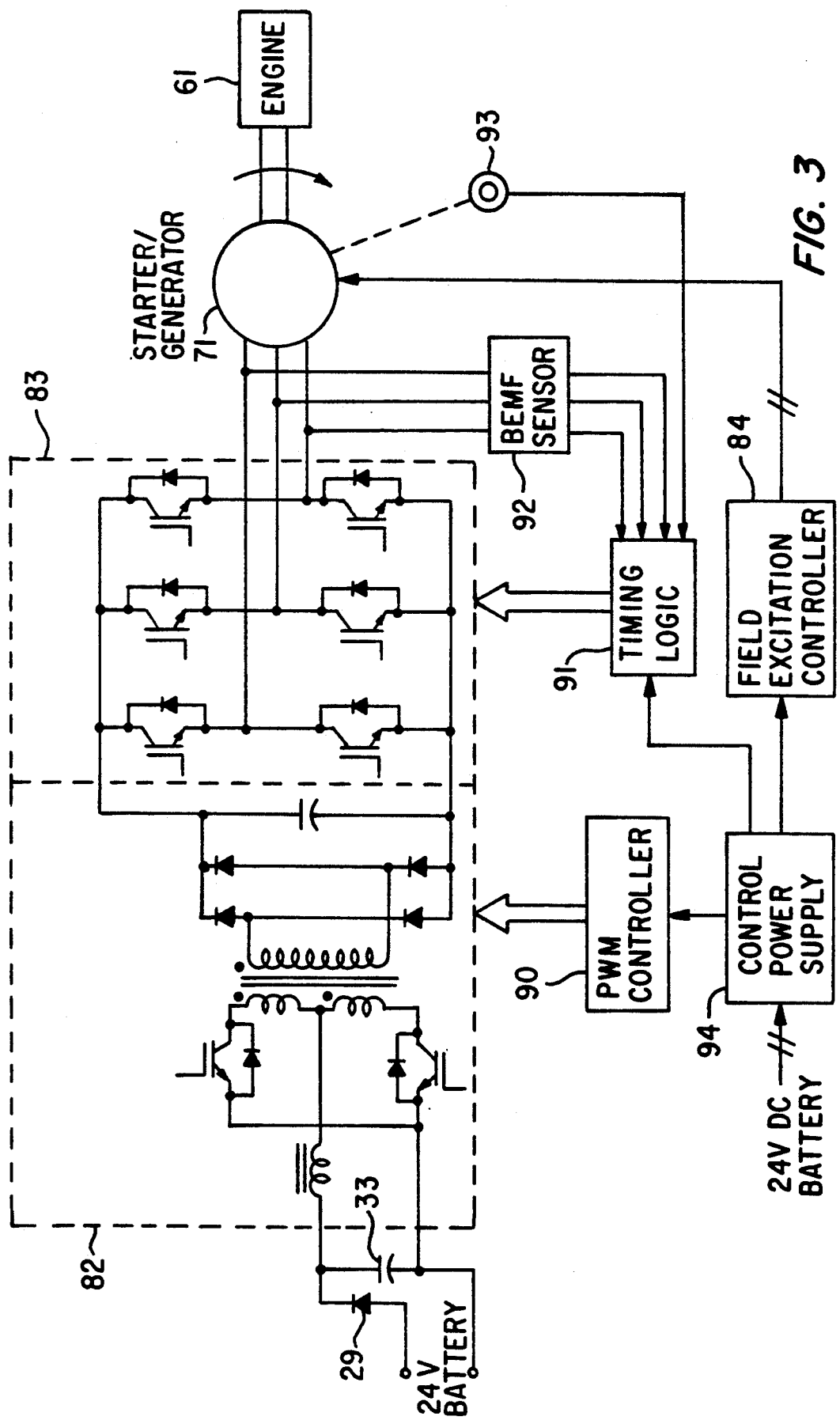
FIG. 3 is a schematic diagram illustrating a circuit equivalent to the preferred embodiment of the present invention during starting of an AC synchronous generator as a synchronous motor from a DC (battery) input.

FIG. 3 illustrates the present invention utilized for starting the AC synchronous generator as a motor from a battery input through a blocking diode 29 The DC start operation is similar to that of the AC start operation except that the input is derived from the battery As the boost converter 82 operates in a discontinous conduction mode, less EMI is generated and, as the current drawn from the battery is continous, ripple current handling capability of the capacitor 33 is less. The blocking diode 29 is incorporated in the invention so that the battery is not overcharged during AC start operation and no battery disconnect switch is required. The remaining components, six-step voltage source inverter 83, starter/generator 71, engine 61, PWM controller 90, control power supply 94, field excitation controller 84, timing logic 91, back EMF sensor 92, and resolver 93, operate as described above It is not intended that this invention be limited to the hardware arrangement, or operational procedures shown disclosed. This invention includes all of the alterations and variations thereto as encompassed within the scope of the claims as follows

I claim:

1. A start system of a turbine engine comprising:
   converter means for receiving input power of either AC or DC; and,
   output power means connected to said converter means for providing converted AC output power with minimum degradation of said input power and with minimal generation of EMI;
   wherein said converter means comprises:
   transformer rectifier means connected to said input power that provides a DC output; and,
   boost converter means connected to said transformer rectifier means for receiving said DC output and for providing variable DC voltage to said output power means;
   wherein said transformer rectifier means comprises: transformer means;
   three-phase full wave bridge rectifier means connected to said transformer means; and,
   capacitor means connected to said three-phase full wave bridge rectifier means;
   wherein said transformer means comprises:
   primary winding means that receives said input power of AC; and,
   two sets of secondary windings connected to said three-phase full wave bridge rectifier means.

2. A turbine engine start system as claimed in claim 1 wherein said output power means comprises:
   voltage source inverter means connected between said converter means and a starter/generator of said turbine engine;
   field excitation controller means for providing three phase excitation to exciter stator of said starter/generator;
   timing logic means for controlling said voltage source inverter means;
   PWM controller means for controlling said converter means; and,
   control power supply means for receiving said input power and for providing control power to said field excitation controller means, and timing logic means and said PWM controller means.

3. A turbine engine start system as claimed in claim 2 wherein said voltage source inverter means comprises:
   transistor diode means connected to said converter means.

4. A turbine engine start system as claimed in claim 3 wherein said transistor/diode means comprises:
three pairs of transistors with each transistor associated with a diode.

5. A turbine engine start system as claimed in claim 2 wherein said voltage source inverter means comprises:
a plurality of steps.

6. A turbine engine start system as claimed in claim 2 wherein said timing logic means comprises:
EMF sensing means for monitoring output of said voltage source inverter means; and,
resolver means for providing a rotor position signal.

7. A start system of a turbine engine comprising;
converter means for receiving input power of DC; and,
output power means connected to said converter means for providing converted AC output power with minimal degradation of said input power and with minimal generation of EMI; wherein said converter means comprises:
boost converter means for receiving said input power of DC and for providing variable DC voltage to said output power means;
wherein said output power means comprises:
voltage source inverter means connected between said boost converter means and a starter/generator of said turbine engine;
field excitation controller means for providing three phase excitation to exciter stator of said starter/generator;
timing logic means for controlling said voltage source inverter means;
PWM controller means for controlling said boost converter means; and,
control power supply means for receiving said input power of DC and for providing control power to said field excitation controller means, said timing logic means and said PWM controller means.

8. A turbine engine start system as claimed in claim 1 wherein said timing logic means comprises:
EMF sensing means for monitoring output of said voltage source inverter means; and,
resolver means for providing a rotor position signal.

* * * * *